(12) United States Patent
Burkatovsky

(10) Patent No.: US 7,505,847 B2
(45) Date of Patent: Mar. 17, 2009

(54) CONFIGURABLE ELECTRONIC CONTROL SYSTEM AND DIAGNOSTIC METHOD

(75) Inventor: Vitaly Burkatovsky, Rishon Le Zion (IL)

(73) Assignee: Eastman Kodak Company, Rochester, NY (US)

( * ) Notice: Subject to any disclaimer, the term of this patent is extended or adjusted under 35 U.S.C. 154(b) by 230 days.

(21) Appl. No.: 11/533,538

(22) Filed: Sep. 20, 2006

(65) Prior Publication Data

US 2007/0067092 A1 Mar. 22, 2007

Related U.S. Application Data

(60) Provisional application No. 60/719,447, filed on Sep. 22, 2005.

(51) Int. Cl.
G06F 19/00 (2006.01)
G06G 7/70 (2006.01)

(52) U.S. Cl. .................. 701/114; 701/115; 701/102; 702/120

(58) Field of Classification Search .............. 701/114, 701/115, 102; 700/27, 28, 39, 7, 276, 277, 700/278, 300; 62/127, 129, 151–156, 198, 62/130; 318/524; 702/120, 183
See application file for complete search history.

(56) References Cited

U.S. PATENT DOCUMENTS

| | | | | |
|---|---|---|---|---|
| 5,276,630 A * | 1/1994 | Baldwin et al. | ............. | 700/276 |
| 5,309,347 A | 5/1994 | Poma et al. | ............. | 363/63 |
| 5,412,291 A * | 5/1995 | Payne et al. | ............. | 318/102 |
| 5,435,141 A * | 7/1995 | Rose et al. | ............. | 62/636 |
| 5,642,247 A | 6/1997 | Giordano | ............. | 361/31 |
| 5,963,706 A | 10/1999 | Baik | ............. | 318/183 |
| 5,990,640 A | 11/1999 | Dwyer et al. | ............. | 318/254 |
| 6,131,692 A | 10/2000 | Kawasuji | ............. | 180/446 |
| 6,147,545 A | 11/2000 | Marshall | ............. | 327/424 |
| 6,683,437 B2 | 1/2004 | Tierling | ............. | 318/811 |
| 6,739,145 B2 * | 5/2004 | Bhatnagar | ............. | 62/127 |
| 6,943,514 B1 | 9/2005 | Chen et al. | ............. | 318/439 |
| 7,096,073 B2 * | 8/2006 | Burkatovsky | ............. | 700/7 |
| 2005/0127859 A1 | 6/2005 | Kernhof et al. | ............. | 318/524 |

FOREIGN PATENT DOCUMENTS

WO   WO 2006/008732   1/2006

\* cited by examiner

Primary Examiner—Willis R. Wolfe, Jr.
Assistant Examiner—Johnny H. Hoang
(74) Attorney, Agent, or Firm—Roland R. Schindler, II

(57) ABSTRACT

A configurable electronic controller system used for signal acquisition of input sensors and control of output loads, connected respectively to the configurable controller, can be re-configured to perform diagnostics on same input sensors and output loads. The diagnostic results provide information on the viability of the tested input sensors and output loads as well as the existence of shorts between input signal lines, while still connected to the sensors.

15 Claims, 7 Drawing Sheets

CONFIGURABLE ELECTRONIC CONTROL SYSTEM AND DIAGNOSTIC METHOD

CROSS-REFERENCE TO RELATED APPLICATIONS

This application claims priority from U.S. Provisional Application No. 60/719,447 entitled "The Use of Configurable Electronic Controller Technology in Vehicles" filed by Burkatovsky on Sep. 22, 2005.

Cross-reference made to commonly assigned, co-pending patent application U.S. Ser. No. 11/533,523 entitled "Apparatus and Method for Current Control in H-Bridge Load Drivers", filed concurrently herewith in the name of Burkatovsky. Further reference is made to U.S. application Ser. No. 11/472,142 entitled "An Adaptive Input-Cell Circuitry Useful in Configurable Electronic Controllers" filed by Burkatovsky on Jun. 21, 2006; U.S. Pat. No. 7,096,073 entitled "Configurable Controller", filed by Burkatovsky on Sep. 22, 2003, and WO 2006/008732 entitled "Apparatus and Method for Interconnect Verification" filed by Burkatovsky on Jul. 7, 2005, the disclosures of which are hereby incorporated by reference.

FIELD OF THE INVENTION

The present invention relates to methods and systems for testing electronic control systems including but not limited to those used in vehicles and in industrial automation applications.

BACKGROUND OF THE INVENTION

Digital electronic control systems are increasingly being used to control vehicle systems, industrial systems and other electro-mechanical systems and devices. For example, such digital electronic control systems are now found in a wide variety of on and off road vehicles, boats, aircraft and other forms of transportation, that typically use digital electronic control systems that include a digital control unit that is in communication with a plurality of sensors and drivers to monitor and control engine systems, steering systems, transmission systems, and/or fuel systems. Similarly, digital electronic control systems in the form industrial controllers are widely used, for example, in manufacturing facilities, chemical plants, air-conditioning systems, printing machines, computer numerical control devices and robotic devices.

The sensors that are usable with such a system can vary widely as can the types of sensor signals provided thereby. For example, different types of sensors can provide signals that have different signal range, different power characteristics, and/or physical connection requirements than those that the electronic control unit is adapted to receive. Such sensor provided output signals can take the form of analogue or digital signals and such sensor provided output signals can include signals characterizing information such as temperature, pressure, RPM and position. Thus, it is common in conventional digital electronic control systems to provide signal acquisition or conditioning circuits to match the signals provided by the sensors in the system to the requirements of the digital control unit used in the system. This circuitry varies according to the sensor type.

Similarly, the digital control units used in such systems do not often provide control signals that can be used to directly drive output devices. Typical output devices include, for example, heaters, solenoids, lamps and electrical motors. Accordingly, conditioning circuits are also provided between the digital control units and such output devices. These adapt the output signals from the digital control units to meet the particular needs of the output devices that they control.

The intensive use of such digital electronic control systems in vehicles and in industrial automation requires diagnostic testing methods in order to ensure correct operation. Conventionally, such diagnostic testing of digital electronic control systems is first done during the production process to verify that the systems perform as expected when compared with specified performance criteria. This is typically done using test fixtures that are specially adapted to this task. It will be appreciated that during production the digital electronic control unit, sensors and drivers have typically not yet been packaged within final enclosures and/or environmental protective systems and that it is comparatively simple to access testing points when these devices are in such a state.

After final manufacture, diagnostic testing can be performed as a matter of preventative maintenance or to diagnose the cause of error conditions. Such post manufacture diagnostic testing can be used to evaluate the operation of circuit elements, the functionality of a tested circuit in the system, in which the specific electronic circuit is installed, and/or to determine whether proper connections exist between the digital control unit and the sensors and/or output devices to which the digital control unit is connected.

Some conventional digital electronic control systems are adapted to facilitate diagnostics. For example, conventional automobile control systems are programmed to detect potential error conditions by analysis of data signals or other signals supplied by the sensors in the vehicle or by detecting that the sensor is not providing data. When such control systems detect these conditions, the digital electronic control systems provide signals that can be read by an appropriate reader connected to the automobile controller.

However, it will be appreciated that because such control systems are adapted to detect a data signal or other signals from a sensor, they are not particularly useful in detecting other conditions related to that sensor that might indicate that the sensor has a fault, that might indicate that a sensor is in a condition that suggests that a fault is imminent, or that might indicate that the electrical connection between the control system and the sensor has a fault. Accordingly, such an engine control module will typically provide only an indication that a fault exists and that the vehicle should be taken for service.

When this occurs, it is left to the service technician to use dedicated diagnostic testing equipment to detect such conditions so that the source of the fault can be determined. Unfortunately, this requires that the technician manually make appropriate diagnostic connections in order to detect signals that are of a different class than the sensor signals sensed during normal operation of the sensor but that indicate potential error conditions. This may involve connecting and disconnecting wiring harnesses or otherwise accessing sensitive electronic components thus risking damage to the components and/or wearing the components.

What is needed therefore is a digital electronic control system that facilitates diagnostic testing of the components of an electronic control system without requiring direct connections between an external device and the active components of a digital electronic control system. What is also needed in the art is a system for accomplishing this result while adding minimal expense and complexity to the overall digital electronic control system.

SUMMARY OF THE INVENTION

In general, a configurable electronic control system is provided. The configurable electronic control system has a control logic module; an adaptive input cell having a sensor input, a control input and an adaptive input cell output, said adaptive input cell being operable in a first mode to convert a first class of signals received at the sensor input into an output signal that can be received by the control logic module and further being operable in a second mode to convert a second class of signals received at the sensor input into an output signal that can be received by the control logic module, said second class of signals being different from the first class of signals; and a sensor. The sensor is connected to the sensor input and adapted to generate signals that reflect a sensed condition, said sensor signals being of the first class of signals. The control logic module is operable in a normal mode wherein said control logic module generates a mode signal causing the adaptive input cell to operate in the first mode and wherein said control logic module further interprets any output signals from the adaptive input cell as being indicative of a sensed condition and the control logic module is further operable in a diagnostic mode wherein said control logic module generates a mode signal causing the adaptive input cell to operate in the second mode, and wherein said control logic module interprets any output signals from the adaptive input cell as being indicative of a diagnostic condition.

BRIEF DESCRIPTION OF THE DRAWINGS

The invention is herein described, by way of example only, with preference to the accompanying drawings, wherein.

DETAILED DESCRIPTION OF THE INVENTION

Figure 1A:
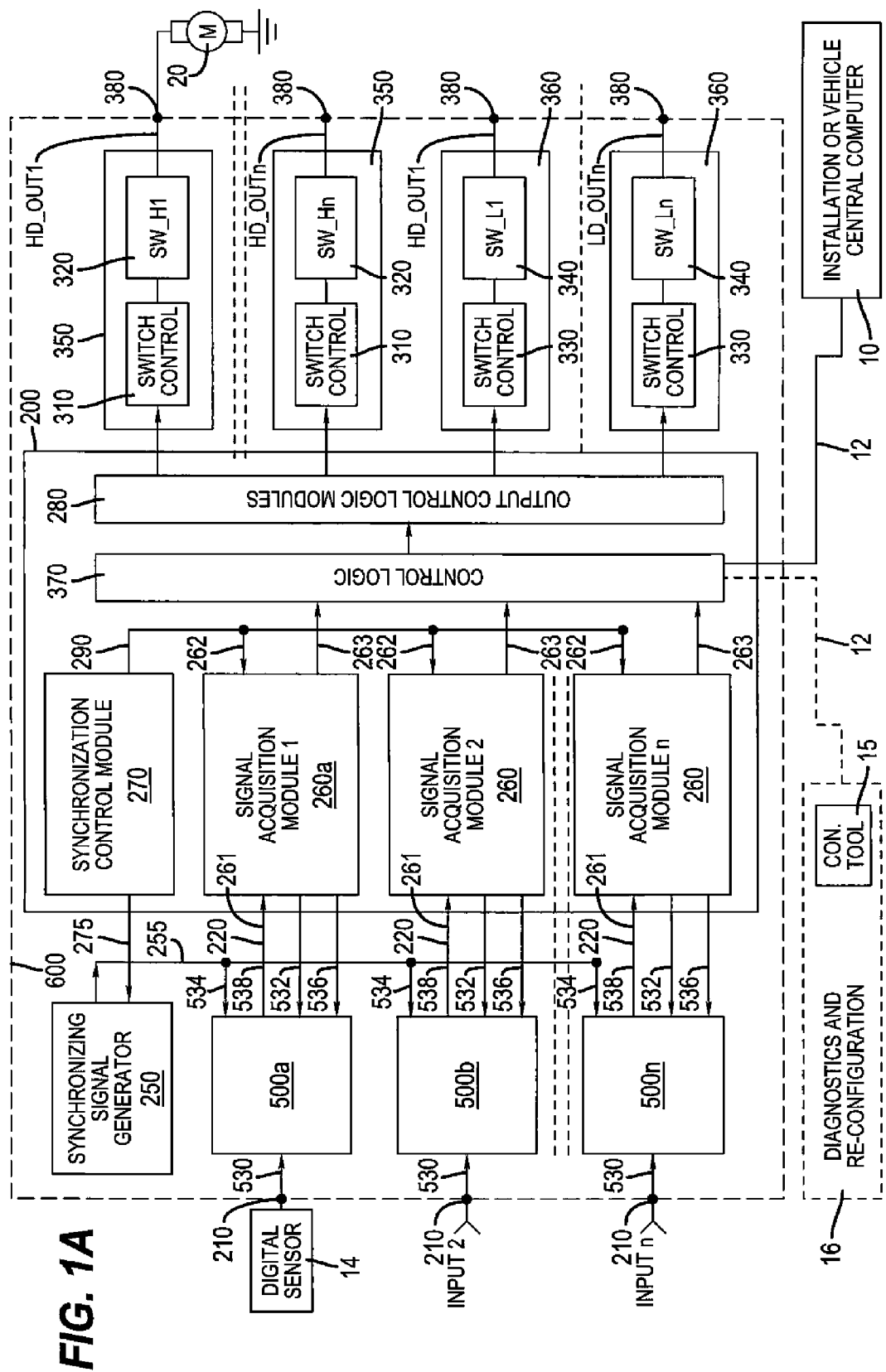
FIG. 1A is a schematic block-diagram of a configurable electronic controller, including adaptive input-cells, as used in industry and vehicles.
Figure 1B:
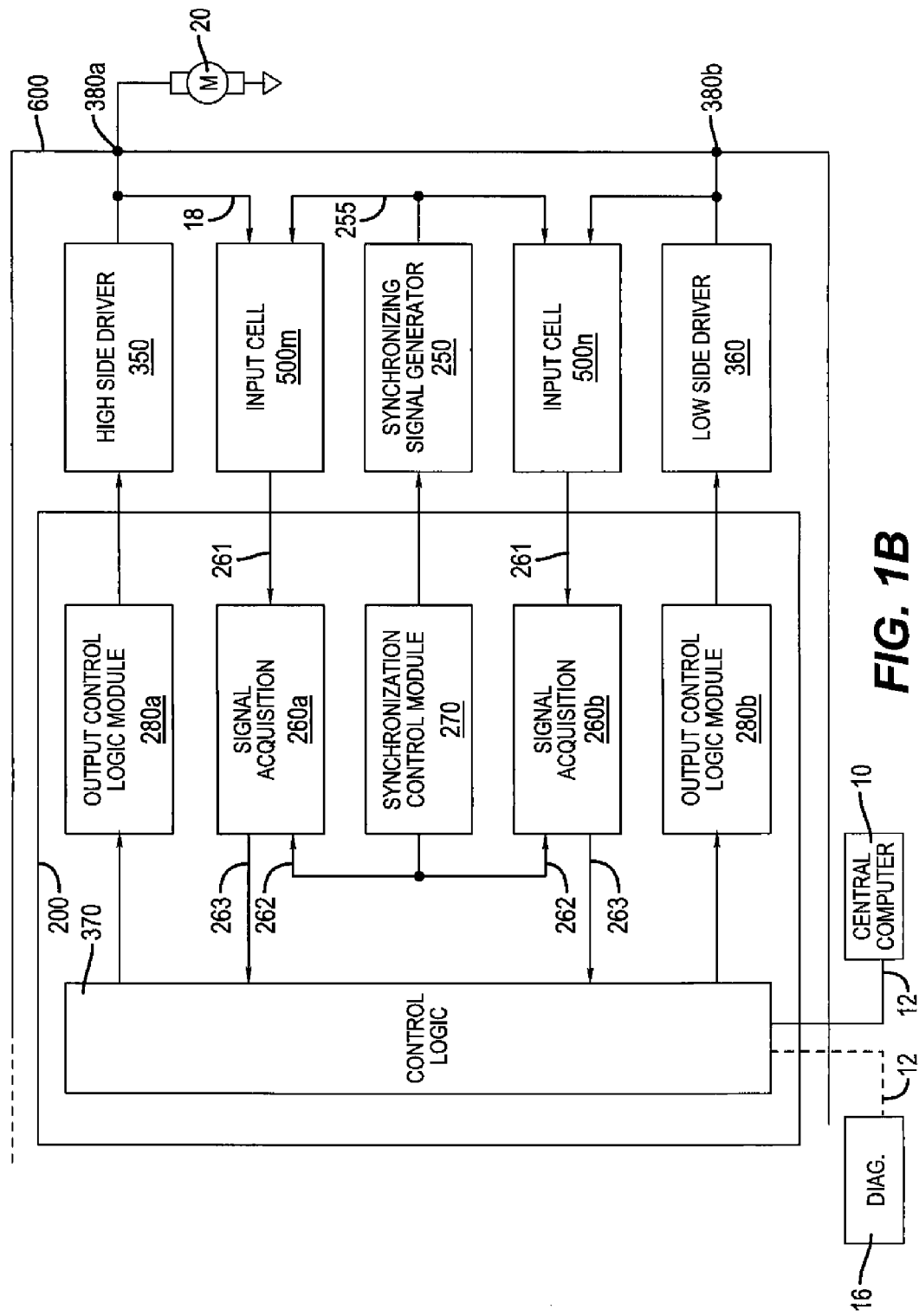
FIG. 1B is a detailed block-diagram scheme of the output part of the configurable electronic controller FIG. 1A.
Figure 2:
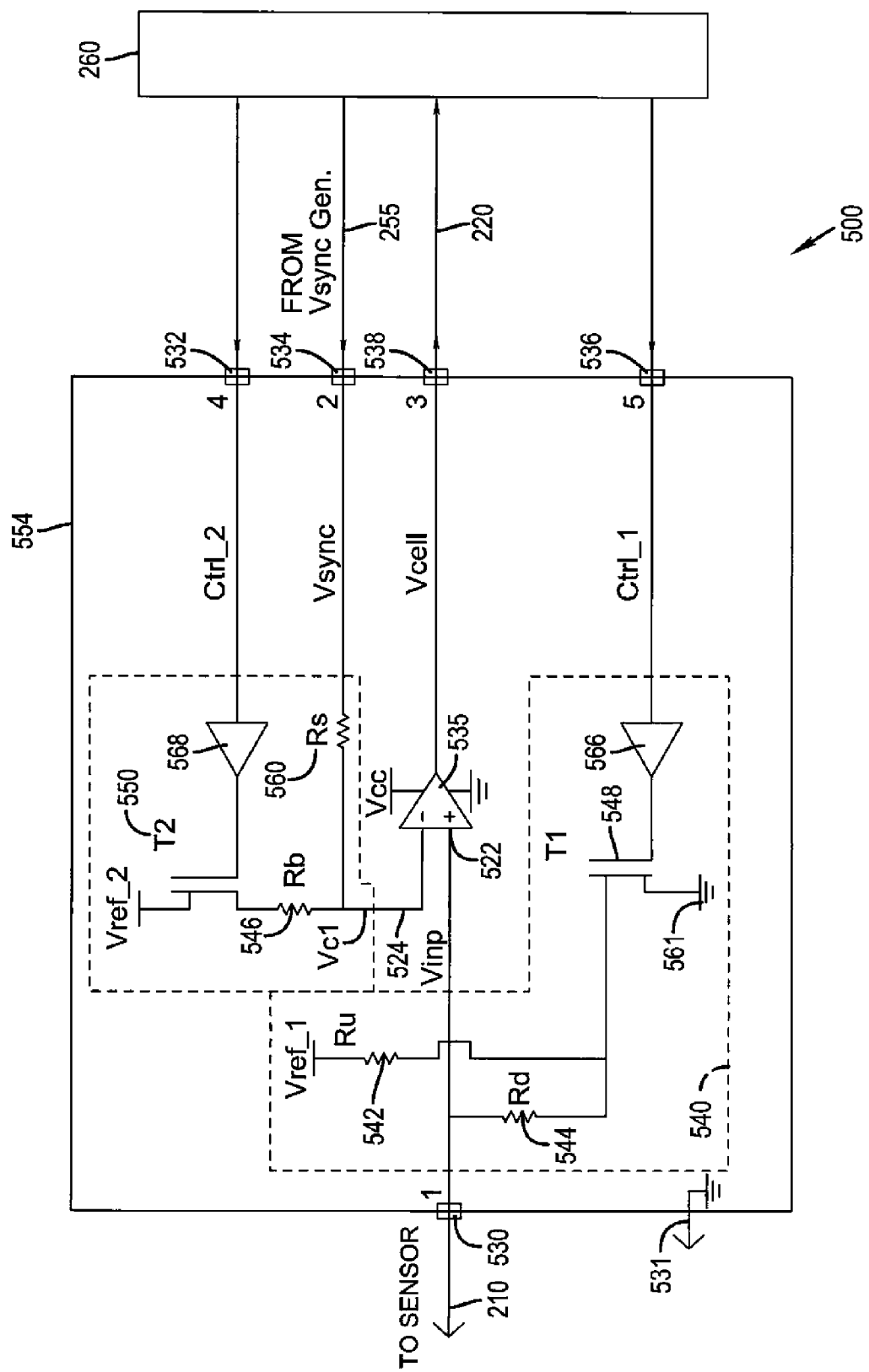
FIG. 2 is a detailed diagram scheme of one embodiment of an adaptive input cell.

FIGS. 1 and 2 show one embodiment of a configurable electronic controller 600 (CEC) used, in this example embodiment to receive signals from a digital sensor 14 and to control a motor 20 comprising a load. CEC 600 can be a single unit or one of several configurable electronic controllers potentially used in an overall system for controlling an industrial device and/or in a vehicle. As is further shown in FIGS. 1A and 1B in this embodiment, CEC 600 is connected to a central computer 10 of such an industrial system or vehicle by way of a communication link 12.

Figure 3:
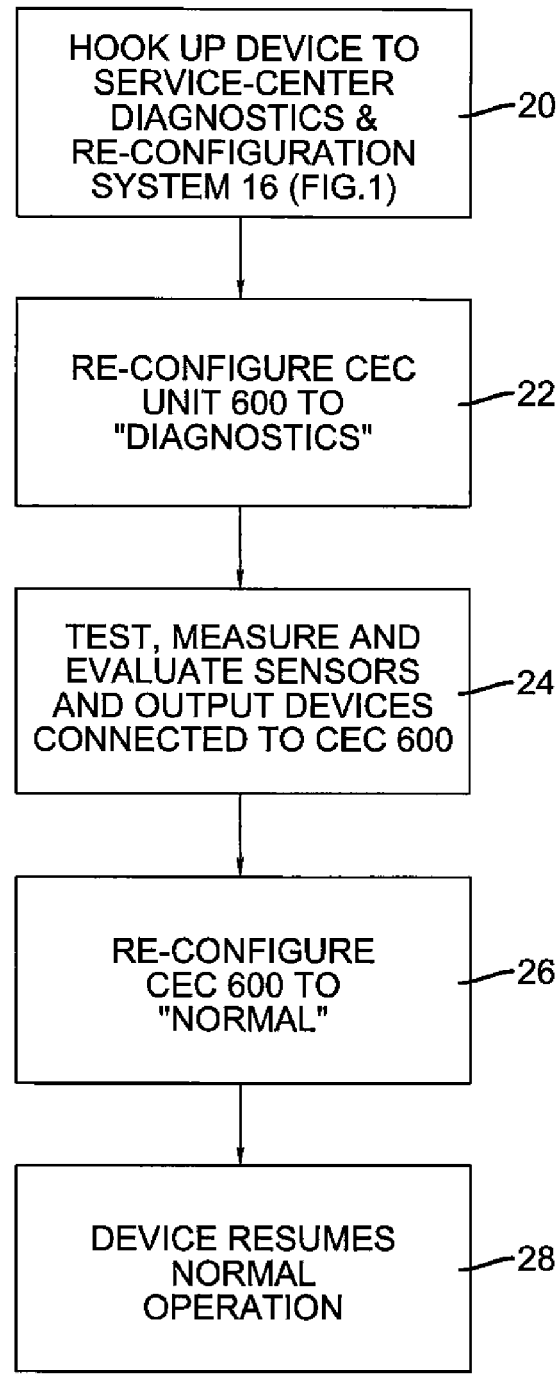
FIG. 3 is a general flow diagram of the dual-purpose process performed on the signal inputs of a configurable electronic controller.

In this embodiment, configurable electronic controller 600 is generally similar to configurable controller 230 of FIG. 3 of U.S. patent application Ser. No. 11/472,142 and comprises a synchronizing signal generator 250, a configurable digital unit 200, such as which comprises at least a synchronization control module 270, control logic module 370, a number of signal acquisition modules 260, configured to accept signals coming from the input pins 210 of CEC 600 through adaptive input cells 500a-500n, and configurable output control logic modules 280, configured to provide control of the loads connected to the output pins 380 of the controller 600, through high-side 350 and/or low-side 360 driver output modules.

The proposed system is designed to support various peripheral environments, using its configuration ability. In this regard, input cells 500a-500n can take any of a variety of forms of an adaptive input cell consistent with the following description and claims including but not limited to any of the embodiments of adaptive input cell 500 claimed and/or described in U.S. patent application Ser. No. 11/472,142.

In the embodiment illustrated in FIGS. 1 and 2, each adaptive input cell 500a-500n takes the form of the embodiment of adaptive input cell 500 described and illustrated in FIG. 2 of U.S. patent application Ser. No. 11/472,142. As is discussed therein, in this embodiment, adaptive input-cell 500 has a plurality of inputs and outputs including a pair of sensor inputs 530 and 531 to receive a signal from input pin 210, a first control input 536, a second control input 532, a waveform input 534 and an output 538. A comparator 535 is provided having two inputs: a first input 522, and a second input 524. First input 522 is connected to sensor input 530 and second input 524 is connected by way of resistor Rs 560 to a waveform input 534. A voltage source Vcc provides power to comparator 535. Comparator 535 generates an output voltage Vcell at output 538. In one example, comparator 535 generates an output voltage Vcell at output 538 based upon an analog comparison of the analog amplitude of the signals at first input 522 and second input 524.

An input "pull-up" or "pull-down" selection circuit 540 is connected to first input 522 and applies an analog pull up bias or an analog pull down bias to signals received at sensor input 530 to form an input voltage Vinp at first input 522 of comparator 535. In the embodiment illustrated in FIG. 2, selection circuit 540 comprises resistors Ru 542 and Rd 544 and first electromagnetically controlled switch 548. In this embodiment, resistors Ru 542, Rd 544 form a first resistor network between a first source of a voltage reference Vref_1 and first input 522 of comparator 535. First electromagnetically controlled switch 548 is arranged between resistors Ru 542 and Rd 544 and a ground 561. Further, in one example of the embodiment of FIG. 2, resistor Ru 542 can have a resistance that is in the range of 2 to 10 Kohm while resistor Rd 544 can have a resistance in the range of 100 to 500 Ohm.

First electromagnetically controlled switch 548 is switchable between one state wherein electromagnetically controlled switch 548 provides an electrical path to a ground 561 and another state wherein first electromagnetically controlled switch 548 does not provide an electrical path to ground 561. Where a path is provided, a pull-down bias is applied to signals at first input 522 and, where no path is provided, a pull-up bias is applied to signals at first input 522. In one example of the embodiment of FIG. 2, first electromagnetically controlled switch 548 is illustrated as a transistor T1 and can comprise for example an N-Channel FET Zetex Semiconductors type ZVN3306F transistor.

In this embodiment, first electromagnetically controlled switch 548 operates in response to a first control signal Ctrl_1 coming from a digital unit 200 which can comprise a programmable Logic Device, for example a field programmable gate array (FPGA) via signal acquisition modules 260 (shown in FIG. 3). First electromagnetically controlled switch 548 receives the first control signal Ctrl_1 by way of first control input 536.

A second network of resistors shown as resistors Rb 546 and Rs 560, and second electromagnetically controlled switch 550 configure a reference control circuit 554. Resistor Rb 546 and second electromagnetically controlled switch 550 are used for acquisition of a synchronization voltage Vsync that is provided by way of waveform input 534. By way of example, and not limiting, reference control circuit 554 is used to provide a reference signal for acquisition of input voltage Vinp from a speed or PWM sensor.

Resistor Rs 560 provides a second resistor network between a source of second voltage reference Vref_2 and second input 524 of comparator 535. Second electromagnetically controlled switch 550 is connected in series between source of second voltage reference Vref_2 and Rb 546 and second input 524 of comparator 535. Second electromagnetically controlled switch 550 is arranged so that it can change between a state that creates an electrical path from the source of second voltage reference Vref_2 to resistor Rb 546 and a state that does not provide such an electrical path. Second electromagnetically controlled switch 550 changes between these states in response to a second control signal Ctrl_2 that is provided by digital unit 200 and signal acquisition module 260 at second control input 532.

In operation, second control signal Ctrl_2 and synchronization voltage Vsync are received from digital unit 200 of FIG. 3. The second control signal Ctrl_2 causes the second electromagnetically controlled switch 550 to enter, for example, the state that creates an electrical path to the source of second voltage reference Vref_2. This provides a biased and attenuated form of synchronization voltage Vsync at second input 524 of comparator 535. The other state of second electromagnetically controlled switch 550 creates an open between source of second voltage reference Vref_2 and second input 524 of comparator 535. For convenience, the resultant synchronization voltage Vsync at second input 524 will be referred to herein as the reference voltage Vc1.

In one non-limiting example embodiment, second electromagnetically controlled switch 550 can be a transistor T2, such as a P-Ch FET Zetex Semiconductors type BS250F, while an example of resistor Rb 546 can have a resistance of between about 10 to 200 Ω. As is also shown in FIG. 2, optional buffers 566 and 568 can be provided to protect against the transmission of unanticipated or unwanted electromagnetic pulses.

It will be appreciated that, in other embodiments, first electromagnetically controlled switch 548 or second electromagnetically controlled switch 550 can comprise any switch that can transition from a state that does not conduct electricity to a state that does conduct electricity in response to an electrical signal, an optical signal, or a magnetic signal can, for example, take an electromagnetically controlled form including, but not limited to, a relay, an opto-coupler, a current controlled switch, a voltage controlled switch or a P-channel field effect transistor. Further, it will be appreciated that the cited resistance values are exemplary only and that other values can be used that achieve results that are consistent with the functionality described herein and that the selection of such other values is within the scope of one of ordinary skill in the art in view of the teachings herein.

It will also be appreciated that first control signal Ctrl_1 and second control signal Ctrl_2 can be provided in either of an analog form or in a digital form as one of a comparatively high signal and a comparatively low signal. The use of a first control signal Ctrl_1 or second control signal Ctrl_2 in a digital form can be advantageous in certain instances in that a configurable electronic controller 600 will typically be adapted to make control determinations and generate control signals that are in digital form.

Accordingly, in this embodiment, adaptive input cells 500a-500n each can comprise an adaptive input cell having a sensor input 530, a second control input 532 and an adaptive input cell output 538, with said adaptive input cell being operable in a first mode comprising a pull-up mode and a second mode comprising a pull down mode. This enables adaptive input cells 500a-500n to be operable to convert a first class of signals received at sensor input 530 into an output for the control logic module 370 and further enables adaptive input cells 500a-500n to be operable in a second mode to convert a second class of signals received at sensor input 530 into an output signal that can be received by the control logic module 370. This can be used to allow control logic module 370 to receive, from the same input cells 500a-500n a second class of signals that can be different from the first class of signals. In the embodiment of FIGS. 1 and 2, the output is provided to control logic module 370 by way of signal acquisition module 260.

The synchronization control module 270 of the configurable digital unit 200 is configured to generate the basic time-dependent signals, in order to synchronize the work of input cells 500a-500n and signal acquisition modules 260. Such synchronization is used for conversion of input signal values to time-based parameter (e.g. pulse width, delay, duty cycle, frequency, etc.) by input cells 500a-500n, and then for converting these time-based parameters to digital form using appropriately configured signal acquisition modules 260. One possible implementation of synchronization control module 270 may be, for example, a counter, which counts incoming pulses with constant interval between them. The sequence of such pulses can be obtained from the system clock, for example. The output (reference data 290) of counter embodiment of synchronization control module 270 is connected to each of the signal acquisition modules 260 and also to synchronizing signal generator 250 as a sync data 275. Synchronizing signal generator 250 is implemented, for example, as a digital to analogue converter. While a counter type synchronization control module 270 is running, the value of the sync data 275, which is equal to reference data 290, is periodically changed from 0 to its maximum value, which causes a saw-teeth shape voltage Vsync on an output net 255 of synchronizing signal generator 250. This voltage is transferred to the second input of input cells 500. The first input of the input cells 500a-500n is connected to a corresponding input pin 210 of controller 600 respectively. The output signal Vcell of input cells 500a-500n is provided at adaptive input cell output 220 which is connected to the input 261 of corresponding signal acquisition module 260. In an alternative embodiment of synchronization control module 270, sync data 275 and reference data 290 may not be equal.

The implementation of configurable signal acquisition modules 260 may vary according to the type of signal that needs to be accepted and thus supports the different peripheral environments.

The second class of signals is different in some aspect than the first class of signals in terms of signal characteristics, signal type or any other characteristics. In one example, one of the first class or second class of signals can be an analog signal and the other of the first class or second class of signals can be a digital signal such as a signal comprised of digital one and digital zero signals. Sensors of all kinds (digital and analog) can be connected to sensor input pins 210, while output devices of all kinds (motors, solenoids, lamps) are connected to output pins 380. For the discussion of FIG. 1 an exemplary digital sensor 14 is connected to input cell 500a, and motor 20 is connected to high side switch (SW_H1) 320. As noted above, in the embodiment of FIG. 1A, CEC 600 is connected, for example, to a central computer 10 by the known in the art CAN (controller area network) communication link 12 or any other known wired or wireless communication system or protocol.

In this embodiment, digital sensor 14 is characterized in a normal operation mode by two signal levels: High and Low. It is assumed that control logic module 370 was factory-configured as known in the art for normal operation to detect digital sensor 14 Hi-Lo signals via input cell 500a and signal acquisition module 260a.

In FIG. 1B, which is based on modules shown in FIG. 1A, a more detailed scheme of the output part of FIG. 1A is shown, including an exemplary output device motor 20. Motor 20 is operated via output pin 380a by high side driver output module 350. It is assumed that control logic module 370 was factory configured as known in the art for normal operation of motor 20. The role of the two input cells 500m and 500n will be described hereinafter. Also shown in FIG. 1B are low side switch controls 330 which are connected between output control logic module 280 and low side switches 340.

The purpose of a diagnostics procedure, as done for example in industrial installations and vehicle service centers, is to gather information and analyze it, in purpose to evaluate the condition of the tested system, device or vehicle; detect faulty modules (before a catastrophic failure occurs) and tune certain systems for best mode of operation. In the case that the device is equipped with configurable electronic controllers 600, as schematically shown in FIGS. 1A, 1B and 2, no special test devices are needed. Instead, as explained in greater detail hereinafter, all that is necessary is to re-configure the programming of CEC 600 appropriately to allow CEC 600 to perform diagnostic testing in a manner that previously required the use of an external device.

These diagnostic methods, which can be operated locally on the device, or remotely by means of communications, are dependent on the type of controls used. The introduction of CEC 600 thus opens new and better roads to the use of diagnostics in industrial automation and vehicles.

According to the embodiment of FIGS. 1 and 2 the service-center is equipped with a "Diagnostics and Re-Configuration" system 16, which can, for example, take the form of a known in the art field programmable gate array (FPGA) "configuration tool" 15 and a diagnostic tool for analysis, evaluation and tuning of the device sub-systems, as needed and known in the art.

In application, a user of the "Diagnostics and Re-Configuration" system 16 connects to the devices to be tested by accessing CEC 600, to which these devices are connected. The test procedure is schematically described in the flow diagram of FIG. 3.

Task 20: The tested device is hooked up to the "Diagnostics and Re-Configuration system" 16 by accessing CEC 600.

Task 22: The configuration tool 15 is used to re-configure CEC 600, as known in the art, into a "diagnostics" mode, replacing the "normal operation" configuration as originally loaded in the factory. This can be done, for example, by a user taking a user action causing the configuration tool 15 to initiate the reconfiguration process.

Task 24: In the "diagnostics" mode testing, measuring and evaluation of sensors and output devices connected to CEC 600 is performed. The procedures for these test, measure and evaluate operations are pre-designed into the "Diagnostics" mode of Task 22. Two exemplary test procedures are demonstrated hereinafter:

A) The output signal of digital sensor 14 (FIGS. 1A and 1B) is evaluated. In this exemplary procedure, this is done by control logic module 370 causing the adaptive input cell 500a that is connected to digital sensor 14 to enter a mode for measuring the analog voltage signal values in its High/Low limits and to generate a signal that reflects such values. Control logic module 370 then interprets the signal to determine the measured voltages and compares these voltage measurements to the operational limits set for normal operation of digital sensor 14. This allows control logic module 370 to detect a faulty digital sensor 14 so that the faulty digital sensor 14 can be replaced as a result of the test, avoiding a possible problem.

Input cell 500a serves in this case for two different missions: acquisition of a digital High/Low signals during normal operation and testing the "viability" of the sensor during the diagnostics procedure. Digital sensor 14 was kept intact in the circuit, with no disconnection/connection procedures.

B) In another exemplary diagnostics procedure of task 24, the state of availability of motor 20 (FIG. 2) is evaluated. Input cell 500m is shown connected to high side driver output module 350 by line 18. In normal functioning, control logic module causes input cell 500m to operate in a first mode suitable for voltage monitoring during operation of motor 20. This mode of combining the operation of input cells 500 with high-side driver output module 350 and low-side driver output module 360, also described in FIG. 14 of U.S. Pat. No. 7,096,073, is another useful known in the art feature of CEC 600. The same input cell 500m is now operated by control logic module 370 in a different way during the "diagnostics" procedure, as follows:

Sampling, by input cell 500m, of the voltage measured on output pin 380a while high side driver output module 350 is off. In this state, the high side switch control 310 presents a finite "off state" resistance.

A measured low voltage is understood by control logic module 370 to indicate a proper motor 20 connection, while a measured high voltage indicates a disconnected motor.

Operating high side driver output module 350 by a very short period pulse, and measuring concurrently, by input cell 500m, the analog values on output pin 380a. A resulting high voltage pulse indicates a proper functionality of the known in the art FET switch in high-side driver output module 350. No reaction indicates a faulty FET or FET driver.

Task 26: at the end of the "diagnostics" procedure described schematically in FIG. 3, CEC 600 is re-configured into its "normal" factory configuration.

Task 28: the tested installation or vehicle can resume normal operation.

According to another preferred embodiment of the system shown in FIG. 1, the "Diagnostics and Re-Configuration" system 16, including the configuration tool 15, can reside permanently in the discussed above industrial system or vehicle, and called to operate in a "diagnostics" procedure when required by the central computer 10.

It will be appreciated that in such manners a CEC 600 perform diagnostics processes for industrial installation control as well as vehicle electronic control modules, allowing such processes to be extended, refined and the execution time substantially shortened in part by use of the subject matter described in U.S. Pat. No. 7,096,073 and U.S. application Ser.

No. 11/472,142. Accordingly, the introduction of CEC 600 opens new roads to electronic control and diagnostics. It will be appreciated therefore that the subject matter disclosed in U.S. Pat. No. 7,096,073, WO 2006/008732 A2 and U.S. application Ser. No. 11/472,142, all by inventor Vitaly Burkatovsky, are relevant to new ways to perform diagnostics, both "on-line" and "off-line", local and remote.

In another example embodiment, CEC 600 can be used to further perform interconnection verification as described generally in WO 2006/008732 A2, which discloses a novel method of interconnect verification between known-in-the-art digital sensors and an electronic controller. The method described therein enables a higher degree of diagnostics by recognizing four states, namely: Hi, Low, Open line, Shorted line using a pin-to-pin short-circuit detection method, to be further described hereinafter. This, in turn, allows detection of short circuits between signal wires of input sensors connected to a CEC 600. Such short circuit can happen due to mechanical or electrical damage to the wiring or cable harnesses serving the device. In terms of the CEC 600 of FIGS. 1A, 1B and 2 the input signals are applied to input pins 210 generally marked as input no. n. Output signals are marked HD_Out no. n and LD_Out no. n on (connector) output pin 380. The pin-to-pin short-circuit detection method can also be applied to output pins 380, by connecting those pins to input cells 500, as basically demonstrated in FIG. 14 of U.S. Pat. No. 7,096,073 and further explained with reference to FIG. 1B of the present application.

Figure 4:
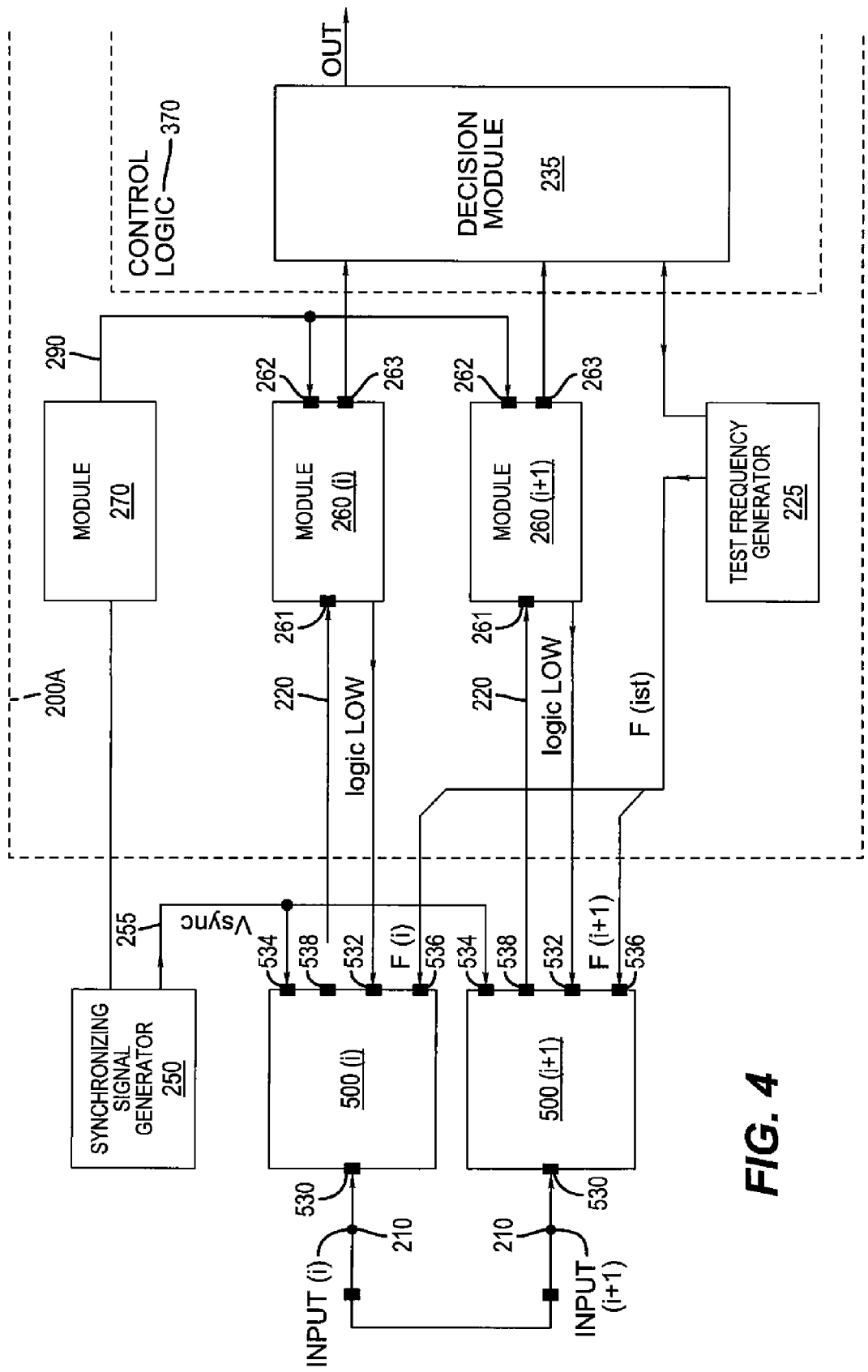
FIG. 4 is a partial schematic block-diagram of a modified configurable electronic controller used for input pin-to-pin short circuit detection methods.

The preferred embodiment of the "pin-to-pin short-circuit detection" method is shown schematically in FIG. 4, which is a partial and modified CEC 600 of FIGS. 1A, 1B and 2. In this embodiment CEC 600 further includes two additional units, namely: a "test frequency generator" 225 and a "decision module" 235, to be further explained hereinafter. Input cell 500 is the adaptive input-cell circuitry, as described in U.S. application Ser. No. 11/472,142, and discussed generally with respect to FIG. 2. This circuitry appears twice in detail illustrated in FIG. 6, with each adaptive input cell 500 using this circuitry.

As shown in FIG. 4, a short circuit 215 exists between input pins 210(i) and 210(i+1) is shown in FIG. 4. The short-circuit might have been caused, for example, by a mechanical damage to the insulation of an electrical cable or harness.

The detection of the short circuit 215 requires a specific diagnostics oriented configuration to be loaded, as known in the art, into CEC 600. In this diagnostics configuration, signal acquisition module 260 is configured to accept analog inputs, as basically explained in FIG. 7 of U.S. Pat. No. 7,096,073 while test frequency generator 225 and decision module 235 are configured to operate as explained hereinafter.

Figure 5:
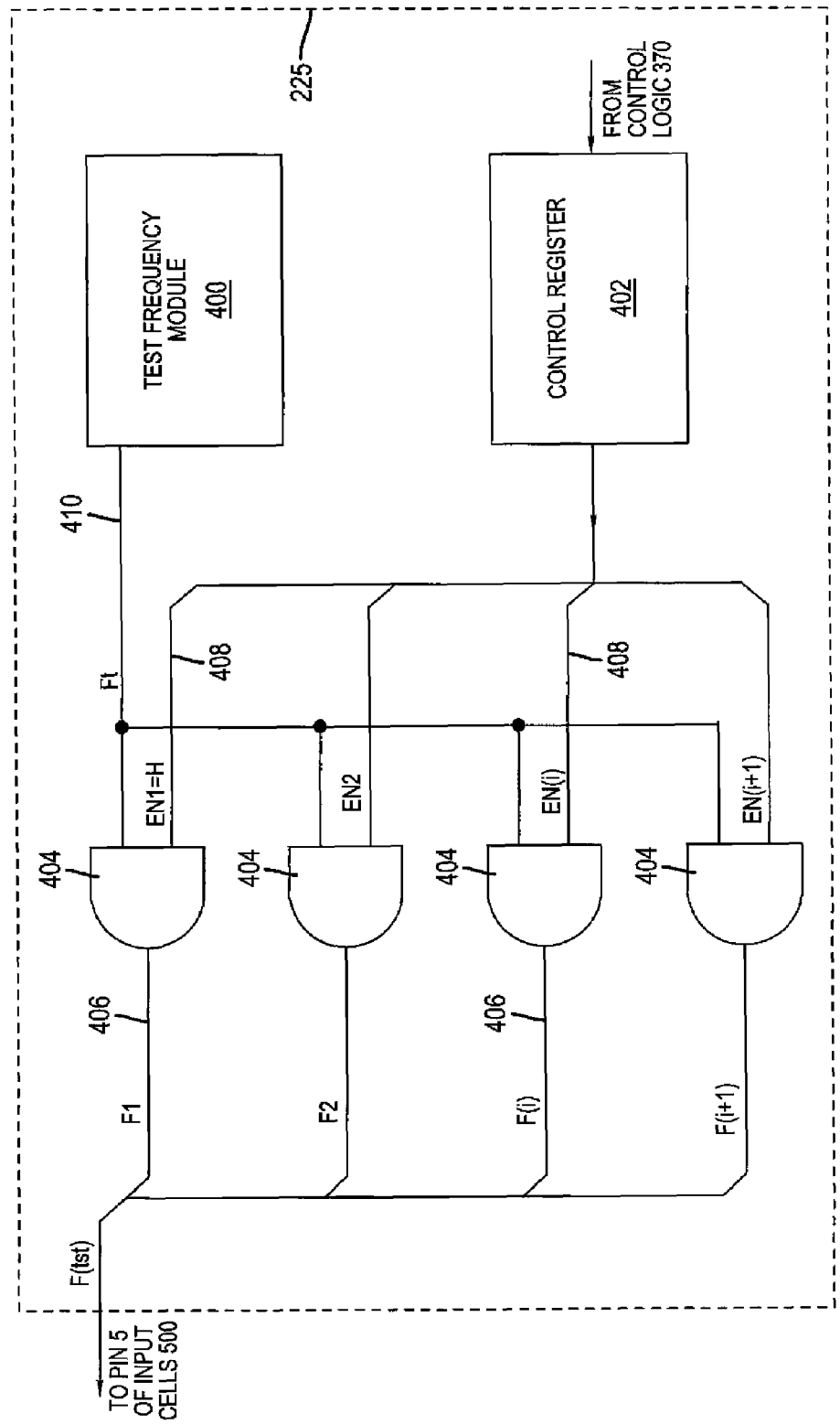
FIG. 5 is a schematic block-diagram of a test frequency generator.

The preferred embodiment of test frequency generator 225 is shown in FIG. 5. In this embodiment, test frequency generator 225 consists of test frequency module 400, control register 402 as well as AND gates 404. Outputs F1 to F(i+1) 406, collectively named F(tst), are connected to first control input 536 of adaptive input cells 500(1) to 500(i+1) of FIG. 6. The output signal F(i) 406 is logic Low while enable signal En(i) 408 is logic Low. When enable signal En(i) 408 is logic High, the test frequency signal Ft 410, generated by the test frequency module 400, passes the AND gate 404 to output signal F(i) 406. In other words: by means of control register 402 the test frequency Ft may be connected to any of the input cells 500(i)-500(i+n).

Figure 6:
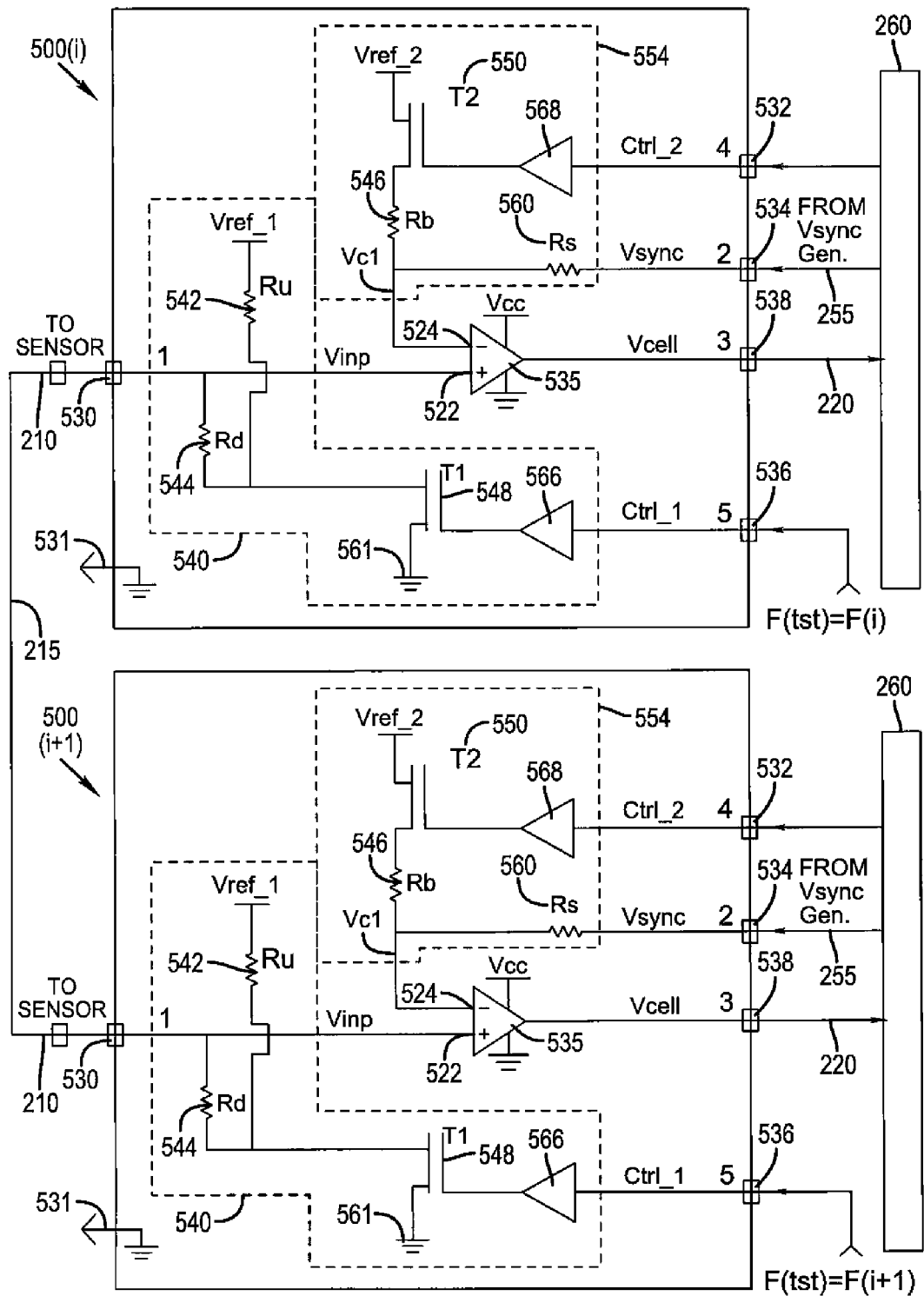
FIG. 6 is a schematic circuitry diagram of two adaptable input cells shorted at their input lines and configured for tests.

In FIG. 4 and FIG. 6 second control input 532 of input cells 500 is configured to be logic Low, while first control input 536 is connected to F(tst). All other connections in the block diagram are the same as described in FIG. 5 in U.S. application Ser. No. 11/472,142.

Test frequency signal Ft 410 controls the pull-up/pull-down configuration of input cell 500. The period of this frequency should be calculated to provide at least one input measurement during the High half cycle of Ft, and at least one measurement during the Low half cycle of Ft. To comply with this requirement Ft should be less than half the frequency of the Vsync signal.

The signal measurement data from signal acquisition modules 260 is used by decision module 235 to detect the status of the "pin-to-pin short-circuit".

The criteria for detection of possible short-circuits between any of input pins 210 is based on logic analysis of the following two tests:

Test A: will identify possible input pins 210, which are shorted between themselves, and at least one of them is connected to a voltage source (Ground or Vcc are particular cases of this condition).

Test B: will identify possible input pins 210 which are shorted between themselves and no input pin is connected to any voltage source including Vcc or Ground, for example, when input pins 210 accept high impedance or an open collector sensor output.

Test A: the analysis of the condition where input pins 210 are shorted between themselves and at least one of the inputs is connected to a voltage source.

For this analysis, control logic module 370 sends control register 402 of FIG. 5 an "all logic High" command, intended to connect simultaneously the test frequency signal Ft 410 to all input cells 500 in a parallel fashion. Signal acquisition modules 260 of FIG. 4 are configured to perform voltage measurements, while test frequency signal Ft 410 alternates between logic High and logic Low respectively.

If the input pins 210(i) and (i+1) are shorted as shown in FIG. 4 and FIG. 6, and one of them is connected to a voltage source (not shown), then the pull-up/pull-down configuration states of the respective input cells 500, caused by test frequency signal Ft 410, will have no impact on the measurement results of the corresponding signal acquisition modules 260(i) and (i+1), and:

$$S(i)H = S(i+1)H = S(i)L = S(i+1)L \quad (1)$$

Wherein:

S(i)H and S(i+1)H—signal measurements data at the output pins 263 of modules 260(i) and (i+1), while test frequency signal Ft 410 was at logic High;

S(i)L and S(i+1)L—signal measurements data at the output pins 263 of modules 260(i) and (i+1), while test frequency signal Ft 410 was at logic Low;

Based on equation (1) the decision module 235 will assume at least a "short-circuit" between the input pins 210(i) and 210(i+1), while at least one of those inputs is connected to a voltage source.

If the signal measurements data does not satisfy equation (1), then the decision module 235 will require performing Test B, as will be explained hereinafter.

The connections of one of input pins 210 to a Ground or to voltage source Vcc are particular cases of this analysis.

Input pins 210, which are not connected to a voltage source, will not comply with Eq. 1 for the same test conditions.

Test B: the analysis of the condition where two input pins 210 are shorted between themselves with no voltage source connected to either input line As explained above for Test A, the logic High and logic Low value alterations of the test frequency Ft signal dictates the respective changes of pull-down and pull-up configuration of the input cells 500(i) and 500(i+1) shown in FIG. 6 with input pins 210(i) and 210(i+1) shorted. The signal Vinp on the first input of comparator 522 of comparator 535 (FIG. 5)—for both input cells 500(i) and 500(i+1)—is identical (shorted) and is determined by resistors Ru(i), Rd(i), Ru(i+1), Rd(i+1) and supply voltage Vref1.

We assume:

$$Ru(i)=Ru(i+1)=\ldots=Ru(i+n)=Ru \text{ and } Rd(i)=Rd(i+1)=\ldots=Rd(i+n)=Rd.$$

For the purpose of Test B, test frequency Ft is connected successively to input cells 500(1), then 500(2), then 500(i) and 500(i+1).

Frequency Ft should be, as stated before, less than half of the Vsync frequency generated by synchronizing signal generator 250 (FIG. 1 and FIG. 4). The sequence of the test is:

1) Vinp on the shorted input pins 210(i) and 210(i+1), while the Ft signal—connected to input cell 500(i)—is logic High, will be:

$$VinpH(i)=VinpH(i+1)=Vref1 \times Rd/(Ru+2 \times Rd) \tag{2}$$

2) Vinp on the shorted pins, while the test frequency Ft signal—still connected to input cell 500(i)—is logic Low, will be:

$$VinpL(i)=VinpL(i+1)=Vref1 \tag{3}$$

Conclusion: Vinp measurements when "shorted" may take-on two different values determined by equation (2) and equation (3).

In comparison, if no short-circuit existed between 500(i) and 500(i+1), then:

1) Vinp on input pin 210(i)—while the test frequency signal Ft, applied to input cell 500(i), is logic High, will be:

$$VinpH(i)=0 \tag{2A}$$

At the same instant Vinp on input pin 210(i+1)—of input cell 500(i+1)—will be:

$$Vinp(i+1)=Vref1 \tag{2B}$$

2) Vinp on the input pin 210(i)—while the test frequency signal Ft, applied to input cell 500(i), is logic Low, will be: VinpL(i)=Vref1

But at the same instant Vinp on input pin 210(i+1)—of input cell 500(i+1)—will be:

$$Vinp(i+1)=Vref1$$

Conclusion: Vinp on input pin 210(i) and 210(i+1) while the test frequency signal Ft—applied to input cell 500(i)—is logic Low, will be:

$$VinpL(i)=Vinp(i+1)=Vref1 \tag{3A}$$

Test B can be summarized in the following pin-to-pin short condition (PPSC) equation:

$$PPSC=S(i)H=S(i+1)H \text{ and } S(i)L=S(i+1)L \tag{4}$$

For: S(i)H, S(i+1)H and S(i)L, S(i+1)L refer to equation (1).

To simplify the representation of decision module logic 235 the result represented by Eq. (3) and Eq. (2B) can be defined as "High (H)" and the result represented by Eq. (2) and Eq. (2A) as "Low (L)".

Inserting the results into Table 1 shows that as long as input pin 210 of input cell 500 are shorted the PPSC will be High and if same input pins 210 are not shorted the PPSC will be Low.

TABLE 1

| Condition | S(i)H | S(i + 1)H | S(i)L | S(i + 1)L | PPSC |
|---|---|---|---|---|---|
| Shorted | L | L | H | H | H |
| not-shorted | L | H | H | H | L |

General Test: The Number of Shorted Pins is More Than Two.

The general method of short-circuit detection between wires in an input cable or harness to a CEC is described hereinafter, based on the two previous analysis methods in Test A and Test B.

Step 1. Measure all tested input voltages, namely Vinp(1) to Vinp (n), as per the method of Test A.

$$\text{If: } S(i)H=S(i+1)H=\ldots S(n)H=S(i)L=S(i+1)L=\ldots S(n)L \tag{5}$$

then: an apparent short-circuit exists between Vinp(i), Vinp(i+1) ... Vinp(n)

This result must be verified in Step 2, to eliminate all input pins truly connected to the same voltage source.

Step 2. The verification process of the result obtained in step 1 is demonstrated in table 2.

TABLE 2

| Input # (1) | Voltage Measurements (2) on input pins 210# | Short Circuit assumption according to Eq. 5 (3) | Voltage expected (Vexp) (4) on input pin 210# | Final Short-circuit status (5) |
|---|---|---|---|---|
| 1 | S(1)H = S(1)L = 5 V | Short between Pin 1 and Pin 12 | 5 V | No short |
| 2 | S(2)H ≠ S(2)L | No short, No Voltage source connected (proceed to Test B) | VexpH (2) = S(2)H VexpL (2) = S(2)L | No short |
| 3 | S(3)H = S(3)L = 3 V | No short, Voltage source 3 V connected | 3 V | No short |

TABLE 2-continued

| Input # (1) | Voltage Measurements (2) on input pins 210# | Short Circuit assumption according to Eq. 5 (3) | Voltage expected (Vexp) (4) on input pin 210# | Final Short-circuit status (5) |
|---|---|---|---|---|
| 4 | S(4)H = S(4)L = 4 V | No short, Voltage source 4 V connected | 3 V | No short, (but proceed to further tests of input #4) |
| ... | | | | |
| 12 | S(12)H = S(12)L = 5 V | Short between Pin 1 and Pin 12 | 5 V | No short |
| 13 | S(13)H ≠ S(13)L | No short, No Voltage source connected (proceed to Test B) | VexpH (13) = S(13)H VexpL (13) ≠ S(13)L | No short (but proceed to further tests of #13) |
| 14 | | | | |
| ... | | | | |
| (i) | S(i)H = S(i)L = 0 V | Short between pins (i), (i + 1) and (n) | Vexp > 0 V | Pins (i) and (n) are shorted to Ground |
| (i + 1) | S(i + 1)H = S(i + 1)L = 0 V | Short between pins (i), (i + 1) and (n) | 0 V (Ground) | No short |
| ... | | | | |
| (n) | S(n)H = S(n)L = 0 V | Short between pins (i), (i + 1) and (n) | Vexp > 0 V | Pins (i) and (n) are shorted to Ground |

Notes to Table 2:
(1) Step 1 was originally applied to a harness connected to input pins 210 (1), 210(2) ... 210(12) ... 210(19) ... 210(i), 210(i + 1) ... 210(n) of input cells 500 respectively
(2) The column "Voltage Measurements" represent the analog voltage measured on the respective input pins 210 (by the signal acquisition module 260), while Test A was applied.
(3) The column "Short Circuit assumption according to Eq. 5" represent the assumed short-circuits of input pins 210.
(4) The column "Voltage expected on input pin 210#" represent the analog voltage measured on the respective input pins 210 (by the signal acquisition module 260) in normal operational conditions.
(5) The column "Final Short-circuit status" represents the net result of Test A, after cross-checking as per notes (3) and (4) above.

Step 3. Test B is applied to those input pins 210, where no voltage source is detected in Step 2, for example: pins 2, 13 of Table 2. In this test, as explained above, the shorted pins are identified by Eq. 4.

Step 4. Abnormal results, detected during Test A and Test B, for example, those indicated in Table 2, re. pins #4 and 13—should be further investigated in additional diagnostic procedures. Such abnormal results may indicate other types of faults It will be appreciated by persons skilled in the art that the embodiments described in this invention for performing diagnostics, which require halt of the normal operation and re-configuration of the CEC 600, can be achieved otherwise by adding or doubling certain modules, which are pre-configured for the diagnostics operation, and reside in the CEC 600 permanently, ready to be operated, for example, by central computer 10 in the "diagnostic" mode. The transition from "normal" to "diagnostics" is therefore instantaneously. This solution is somewhat more complicated but got its operational merits.

It will be appreciated by persons skilled in the art that the present invention is not limited to what has been particularly shown and described hereinabove. Rather the scope of the present invention is defined by the appended claims and includes both combinations and sub combinations of the various features described hereinabove as well as variations and modifications thereof which would occur to persons skilled in the art upon reading the foregoing description.

| PARTS LIST | |
|---|---|
| 10 | central computer |
| 12 | communication link |
| 14 | digital sensor |
| 15 | configuration tool |
| 16 | diagnostics and re-configuration system |
| 18 | line |
| 20 | motor |
| 20 | connect device task |
| 22 | re-configure CEC unit to diagnostics task |
| 24 | test, measure and evaluate sensors and output devices connected to CEC task |
| 26 | re-configure CEC to normal task |
| 28 | device resumes normal operation task |
| 200 | digital unit |
| 200A | configurable module |
| 210 | input pin |
| 215 | short circuit |
| 220 | adaptive controller output or adaptive input cell output |
| 225 | test frequency generator |
| 230 | configurable controller |
| 235 | decision module |
| 250 | synchronizing signal generator |
| 255 | output net |
| 260 | signal acquisition module |
| 260a-260b | signal acquisition module |
| 261 | input of signal acquisition module |
| 262 | input of signal acquisition module |
| 263 | output pin |
| 270 | synchronization control module |
| 275 | sync data |

-continued

PARTS LIST

| | |
|---|---|
| 280 | output control logic module |
| 280a-280b | output control logic module |
| 290 | reference data |
| 310 | high side switch control |
| 320 | high side switch |
| 330 | low side switch control |
| 340 | low side switch |
| 350 | high side driver output module |
| 360 | low side driver output module |
| 370 | control logic module |
| 380 | output pins |
| 380a | output pins |
| 380b | output pins |
| 400 | test frequency module |
| 402 | control register |
| 404 | gates |
| 406 | output signals |
| 408 | enable signals |
| 410 | test frequency signal Ft |
| 500 | input cell |
| 500a-500n | input cells |
| 522 | first input of comparator |
| 524 | second input of comparator |
| 530 | sensor input |
| 531 | sensor input |
| 532 | second control input |
| 534 | waveform input |
| 535 | comparator |
| 536 | first control input |
| 538 | output |
| 540 | pull-up/pull-down selection circuit |
| 542 | resistor Ru |
| 544 | resistor Rd |
| 546 | resistor Rb |
| 548 | first electromagnetically controlled switch |
| 550 | second electromagnetically controlled switch |
| 554 | reference control circuit |
| 560 | resistor Rs |
| 566 | buffer |
| 568 | buffer |
| 600 | configurable electronic controller |
| Ctrl_1 | first control signal |
| Ctrl_2 | second control signal |
| 561 | ground |
| Vcell | output voltage |
| Vc1 | reference voltage |
| Vcc | voltage source |
| Vinp | input voltage |
| Vref_1 | source of first voltage reference |
| Vref_2 | source of second voltage reference |
| Vsync | synchronization voltage |
| T1 | transistor |
| T2 | transistor |

The invention claimed is:

1. A configurable electronic control system comprising:
a control logic module;
an adaptive input cell having a sensor input, a control input and an adaptive input cell output, said adaptive input cell being operable in a first mode to convert a first class of signals received at the sensor input into an output signal that can be received by the control logic module and further being operable in a second mode to convert a second class of signals received at the sensor input into an output signal that can be received by the control logic module, said second class of signals being different from the first class of signals; and
a sensor connected to the sensor input and adapted to generate signals that reflect a sensed condition, said sensor signals being of the first class of signals;
said control logic module being operable in a normal mode wherein said control logic module generates a mode signal causing the adaptive input cell to operate in the first mode and wherein said control logic module further interprets any output signals from the adaptive input cell as being indicative of a sensed condition;
said control logic module further being operable in a diagnostic mode wherein said control logic module generates a mode signal causing the adaptive input cell to operate in the second mode, and wherein said control logic module interprets any output signals from the adaptive input cell as being indicative of a diagnostic condition.

2. The configurable electronic control system of claim 1, wherein said control logic module is programmable such that it can be programmed to operate in one of the normal mode or diagnostic mode in response to a user action.

3. The configurable electronic control system of claim 1, wherein one of the first class or second class of signals is an analog signal and wherein the other of the first class or second class of signals is a digital signal.

4. The configurable electronic control system of claim 1, wherein the sensor comprises a sensor that generates a digital sensor signal characterized by two signal levels, a high signal and a low signal and wherein:
during a normal operation mode, the control logic module generates a mode signal at the control input of the adaptive input cell causing the adaptive input cell to generate an output signal in the form of at least one of a digital one and a digital zero in response to the high signal and the low signal respectively; and,
during the diagnostic mode, the control logic module generates a mode signal at the control input of the adaptive input cell causing the adaptive input cell to generate an output that can be used to reflect a measured analog voltage of the high signal and the low signal and, wherein the control logic module is programmed to determine whether the sensor is operating based upon the measured analog voltage.

5. A system for performing diagnostic tests on input or output devices, the system comprising:
a configurable electronic controller including at least two input-cells, at least two signal acquisition modules connected respectively to said input-cells and a configurable control logic module connected to said signal acquisition modules, said control logic module further including a test frequency generator and a decision module;
at least one output control logic module connected to said control logic module and at least one load driver connected to said output control logic module; and
at least one electronic sensor connected to either of said input-cells and at least one electrical load connected to said load driver;
wherein said test frequency generator can be configured to supply a test waveform to said input cells in parallel or sequentially;
wherein said signal acquisition modules can be configured to accept analog signals from said input cells, and output digital signals to said decision module, and
wherein upon performing a diagnostic test on the input lines of said input cells said decision module can detect and signal when a short exists between input lines.

6. The system for performing diagnostic tests of claim 5, wherein said diagnostic test can distinguish between shorted input lines of said input cells wherein at least one of said shorted input lines is also connected to a voltage source and shorted input lines of said input cells which are not connected to any voltage source.

7. The system for performing diagnostic tests of claim 6, wherein said voltage source includes Vcc and Ground.

8. The system for performing diagnostic tests of claim 6, wherein input lines which are not connected to any voltage source include high impedance and open collector sensor outputs.

9. The system for performing diagnostic tests of claim 5, wherein said test frequency generator generates a test waveform at a frequency which is less than half the synchronization frequency serving said configurable electronic controller.

10. A method of performing diagnostic tests on input and output devices connected respectively to a configurable electronic controller, comprising:
- providing a configurable electronic controller including at least two input-cells, at least two signal acquisition modules connected respectively to said input-cells and a configurable control logic module connected to said signal acquisition modules, said control logic module further including a test frequency generator and a decision module;
- providing at least one output control logic module connected to said control logic module and at least one load driver connected to said output control logic module; and
- providing at least one electronic sensor connected to either of said input-cells and at least one electrical load connected to said load driver;
- wherein said signal acquisition modules can be configured to accept analog signals from said input cells, and output digital signals to said decision module, and
- wherein upon performing a diagnostic test on the input lines of said input cells said decision module can detect and signal shorts between input lines.

11. The method of performing diagnostic tests of claim 10, wherein said diagnostic test can distinguish between shorted input lines of said input cells wherein at least one of said shorted input lines is also connected to a voltage source and shorted input lines of said input cells which are not connected to any voltage source.

12. The method of performing diagnostic tests of claim 11, wherein said voltage source includes Vcc and Ground.

13. The method of performing diagnostic tests of claim 11, wherein input lines which are not connected to any voltage source include high impedance and open collector sensor outputs.

14. The method of performing diagnostic tests of claim 10, wherein said test frequency generator generates a test waveform at a frequency which is less than half the synchronization frequency serving said configurable electronic controller.

15. A method of performing diagnostic tests on input and output devices connected respectively to a configurable electronic controller, comprising:
- providing a configurable electronic controller including at least one adaptive input-cell, at least one signal acquisition module connected to said adaptive input-cell and a control logic module connected to said signal acquisition module, at least one output control logic module connected to said control logic module and at least one load driver connected to said output control logic module;
- providing at least one electronic sensor connected to said adaptive input-cell and at least one electrical load connected to said load driver; and
- providing a diagnostics and re-configuration module connected to said control logic module;
- wherein said control logic module is configured for a normal mode to sense by said adaptive input-cell the output of said electronic sensor, drive said electrical load and measure its performance;
- wherein said control logic module, when re-configured to diagnostic mode, will cause said adaptive input-cell to obtain signals from which it is possible to evaluate the viability of said electronic sensor, and
- wherein said control logic module, when re-configured to diagnostics, will evaluate the viability of said electrical load.

* * * * *